(12) United States Patent
Kim et al.

(10) Patent No.: US 7,075,987 B2
(45) Date of Patent: Jul. 11, 2006

(54) ADAPTIVE VIDEO BIT-RATE CONTROL

(75) Inventors: Hyung-Suk Kim, Chandler, AZ (US);
Hyun M. Kim, Scottsdale, AZ (US);
Tinku Acharya, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 279 days.

(21) Appl. No.: 10/253,943

(22) Filed: Sep. 23, 2002

(65) Prior Publication Data

US 2004/0057516 A1   Mar. 25, 2004

(51) Int. Cl.
*H04N 7/12* (2006.01)
*H04N 11/02* (2006.01)

(52) U.S. Cl. .................. 375/240.16; 375/240.02; 348/700

(58) Field of Classification Search .......... 375/240.01, 375/240.02, 240.06, 240.16, 240; 348/700
See application file for complete search history.

(56) References Cited

U.S. PATENT DOCUMENTS

| | | | | |
|---|---|---|---|---|
| 5,565,920 A | * | 10/1996 | Lee et al. | 375/240.11 |
| 5,748,249 A | * | 5/1998 | Fujiwara | 375/240.05 |
| 6,151,360 A | * | 11/2000 | Kato et al. | 375/240.03 |
| 6,324,214 B1 | * | 11/2001 | Mihara | 375/240.02 |
| 6,678,322 B1 | * | 1/2004 | Mihara | 375/240.02 |
| 2003/0053538 A1 | * | 3/2003 | Katsavounidis et al. | 375/240.01 |
| 2003/0072373 A1 | * | 4/2003 | Sun | 375/240.16 |

* cited by examiner

*Primary Examiner*—Gims Philippe
*Assistant Examiner*—Erick J. Rekstad
(74) *Attorney, Agent, or Firm*—Justin B. Scout

(57) ABSTRACT

The present disclosure relates to the compression of data and, more particularly, to the compression of video data based at least upon a variable bit rate compression scheme.

21 Claims, 4 Drawing Sheets

ADAPTIVE VIDEO BIT-RATE CONTROL

BACKGROUND

1. Field

The present disclosure relates to the compression of data and, more particularly, to the compression of video data based at least upon a variable bit rate compression scheme.

2. Background Information

The control of video bit rate—the number of bits per second used to encode a video data—is an important issue in the field of digital video compression. Generally there are two kinds of bit rate control schemes, constant bit rate (CBR) and variable bit rate (VBR) control.

A CBR control scheme generally allocates a constant amount of bits to each frame or picture in video data. Some CBR schemes may subdivide the video data into a series of groups of pictures (GOPs) and allocate a constant amount of bits to represent each GOP. One of the advantages of a CBR scheme is that the allocation of bits is simple. One of the disadvantages of a CBR scheme is that the quality of the resulting compressed video data may vary as a function of the complexity of each GOP. If a GOP is complex, for example, it may contain a large number of colors, or a lot of motion, and, therefore, require a relatively large number of bits to capture the complexity of the GOP without an unacceptable loss of information. Conversely, a simple GOP requires a relatively low number of bits to capture the simplicity of the GOP, and, therefore, an excess number of bits may be used to encode the GOP. Because, under a CBR scheme, the same number of bits is used to represent both a highly complex GOP and a very simple GOP, the percentage of information that is captured in the compressed video data varies based on the complexity of the GOP. As a result, a user typically perceives the compressed video data as varying in quality through the video.

A VBR control scheme typically breaks video data into a series of groups of pictures. Each GOP is allocated a different number of bits depending upon the complexity of the GOP. A VBR scheme typically results in higher video quality than a CBR scheme because, as the complexity of the video data increases, the number of bits used to represent the video may increase. However, the quality of the resulting compressed video data is often dependent upon the ability of the VBR scheme to allocate a proper number of bits to the GOP. If the VBR scheme allocates too many bits the quality of the video may be high, but the size of the compressed video data may increase unnecessarily. If the VBR scheme allocates too few bits, the size of the compressed video data may be small, but quality of the video may decrease.

BRIEF DESCRIPTION OF THE DRAWINGS

Subject matter is particularly pointed out and distinctly disclosed in the concluding portions of the specification. The disclosed subject matter, however, both as to organization and the method of operation, together with objects, features and advantages thereof, may be best understood by a reference to the following detailed description when read with the accompanying drawings in which.

DETAILED DESCRIPTION

In the following detailed description, numerous details are set forth in order to provide a thorough understanding of the present disclosed subject matter. However, it will be understood by those skilled in the art that the disclosed subject matter may be practiced without these specific details. In other instances, well-known methods, procedures, components, and circuits have not been described in detail so as to not obscure the disclosed subject matter.

Figure 1:
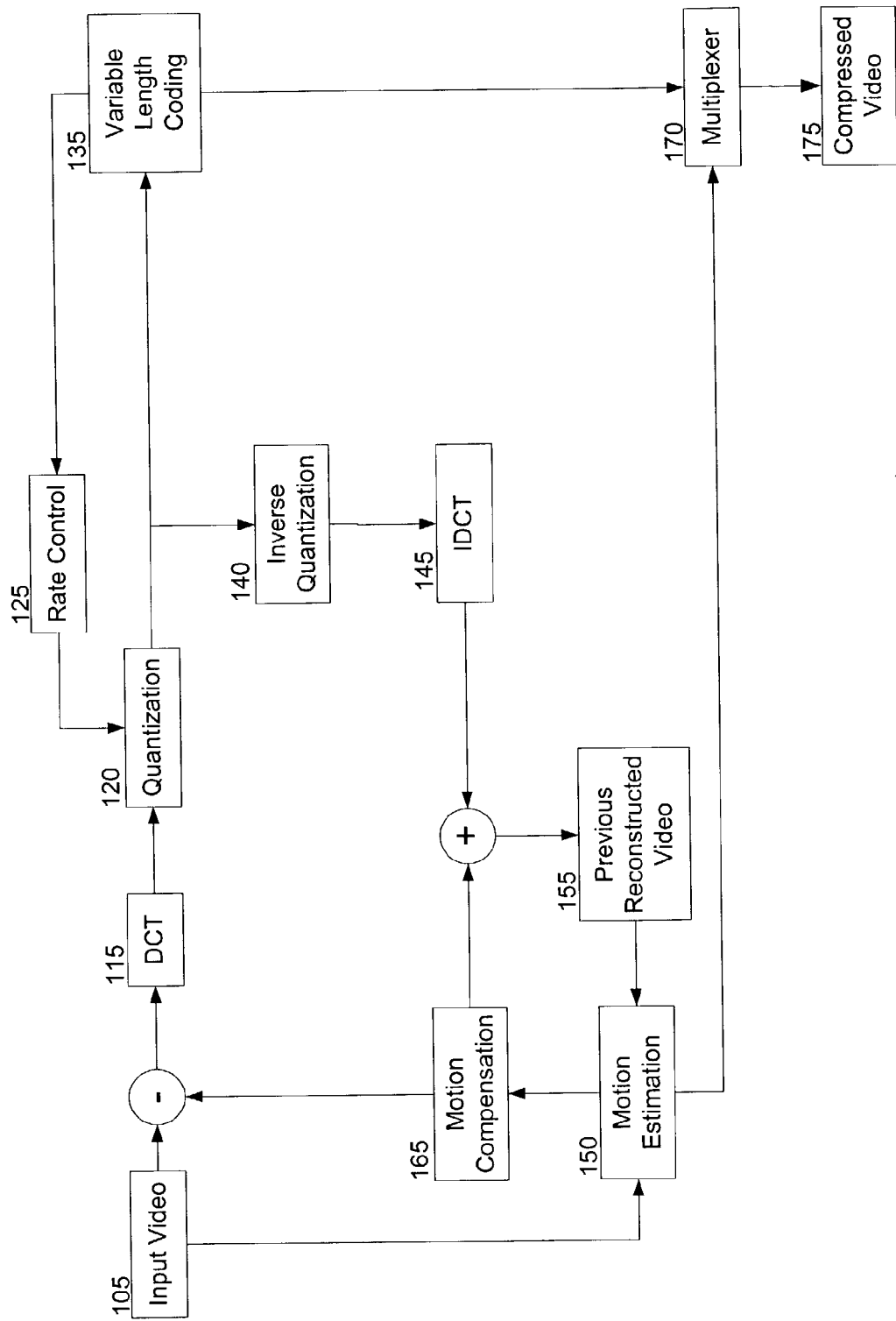
FIG. 1 is a block diagram illustrating a technique currently used to compress a video data.

FIG. 1 is a block diagram illustrating a technique currently used to compress a video data. Input video 105, typically just a frame of the video data, is received by the compression device. The first step in compressing the video data is to subtract a previous transmitted frame from the current frame so that only the difference or residue needs to be encoded and transmitted. This means that areas of the frame that do not change, such as, for example, the background, are not encoded. Further reduction is achieved by motion estimation module 160, that may attempt to estimate where areas of the previous frame have moved to in the current frame. Motion compensation module 165 compensates for this movement. The motion estimation module 160 may compare each macroblock, often a 16×16 pixel block, in the current frame with its surrounding area in the previous frame and may attempt to find a match. Motion compensator module 165 may move the matching area into the current macroblock. The motion compensated macroblock is subtracted from the current macroblock. If the motion estimation and compensation process is efficient, the remaining "residual" macroblock should contain only a small amount of information.

A macroblock is conventional a block of 16×16 pixels; however, it is contemplated that any number of pixels may be used. Typically, a macroblock may include four 8×8 luminance blocks and two 8×8 chrominance blocks. It is contemplated that in some embodiments, a macroblock may be subdivided using other techniques.

A process known as a discrete cosine transform (DCT) 115 may transform a block of pixel values (or residual values) into a set of "spatial frequency" coefficients. The DCT may operate on a 2-dimensional block of pixels (rather than on a 1-dimensional signal) and may be particularly good at "compacting" the energy in the block of values into a small number of coefficients. This means that only a few DCT coefficients may be used to recreate a recognizable copy of the original block of pixels. For a typical block of pixels, most of the coefficients produced by the DCT are close to zero. Quantization module 120 may reduce the precision of each coefficient so that the near-zero coefficients are set to zero and only a few significant non-zero coefficients are left. This may be done in practice by dividing each coefficient by an integer scale factor and truncating the result. It is important to realize that the quantization module 120 "throws away" information. How much information is thrown away is controlled by rate control 125. In a CBR scheme, rate control 125 is a fixed preconfigured value. Under a VBR scheme, rate control 125 is more complex.

Variable length encoder 135 replaces frequently-occurring values with short binary codes and replaces infrequently-occurring values with longer binary codes. The result is a sequence of variable-length binary codes. These codes are combined, via multiplexer 170, with synchronization and control information (such as the motion "vectors" required to reconstruct the motion-compensated reference frame) to form the encoded or compressed video data 175.

The current frame is often stored so that it can be used as a reference when the next frame is encoded. Instead of simply copying the current frame into a store, the quantized coefficients are re-scaled, inverse transformed using an Inverse Discrete Cosine Transform (IDCT) and added to the motion-compensated reference block to create a reconstructed frame that is placed in a store (the frame store). This process occurs via inverse quantization 140, IDCT 145, and previous reconstructed video 155. This is often done so that the contents of the frame store in the encoder are identical to the contents of the frame store in the decoder. When the next frame is encoded, motion estimation 160 uses the contents of this frame store to determine the best matching area for motion compensation.

Figure 2:
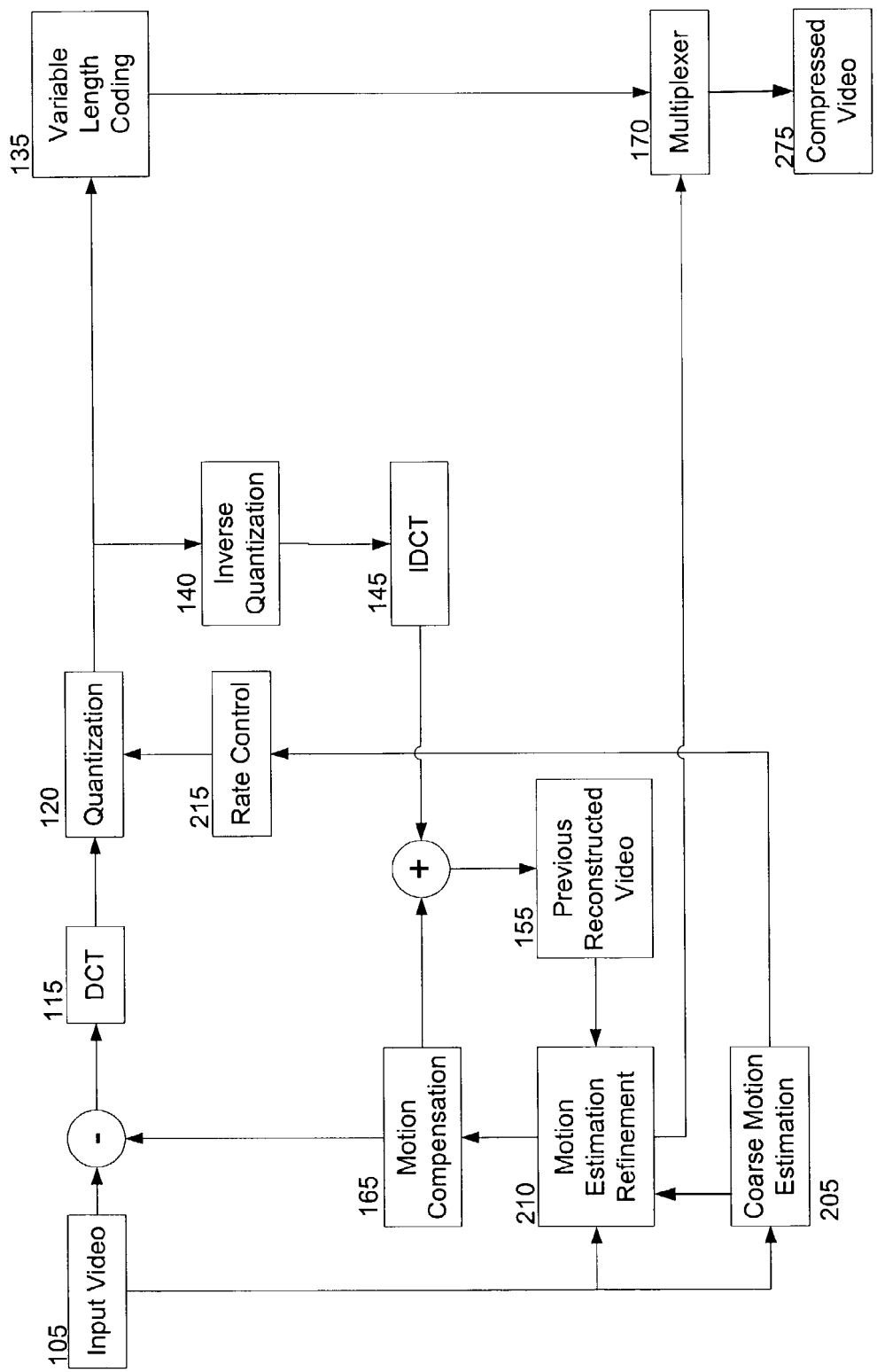
FIG. 2 is a block diagram illustrating a technique to compress a video data in accordance with an embodiment of the disclosed subject matter.

FIG. 2 is a block diagram illustrating a technique to compress a video data in accordance with an embodiment of the disclosed subject matter. The illustrated embodiment is a specific example that highlights some of the differences between the disclosed subject matter and the currently used technique illustrated by FIG. 1. However, the disclosed subject matter is not limited by this specific illustrative example. It is contemplated that other embodiments of the disclosed subject matter may exist.

The majority of modules illustrated in the embodiment of FIG. 2 are described above, in conjunction with FIG. 1. In FIG. 1, motion estimation 160 receives a single frame of video data. In the embodiment illustrated by FIG. 2, coarse motion estimation 205 receives a number of GOPs. It is contemplated that the video data received by coarse motion estimation 205 may represent a video in its entirety or merely a number of GOPs of the video data. Coarse motion estimation 205 may estimate the amount of motion in both the video data, and the current GOP. The estimation of the amount of motion in the video data and the current GOP may be utilized by rate control 215.

Rate control 215 may estimate the number of bits that will be used, to represent the video data received by coarse motion estimation module 205, in the compressed video data. Rate control 215 may assign a portion of the estimated bits to the current GOP or current frame. Rate control 215 may determine the proper portion of bits to assign based, at least in part, upon the ratio of motion in the current GOP to the motion in the video data. In one embodiment, the percentage of bits used to encode a GOP may be proportional to amount of motion in the GOP. However, it is contemplated that other relationships between motion and number of bits may be used.

Motion estimation refinement module 210 may attempt to estimate motion between two frames of the video data. Ultimately, the variable length codes, derived as described above, may be combined, via multiplexer 170, with synchronization and control information, computed by motion estimation refinement module 210, to form the encoded or compressed video data 275.

Figure 3:
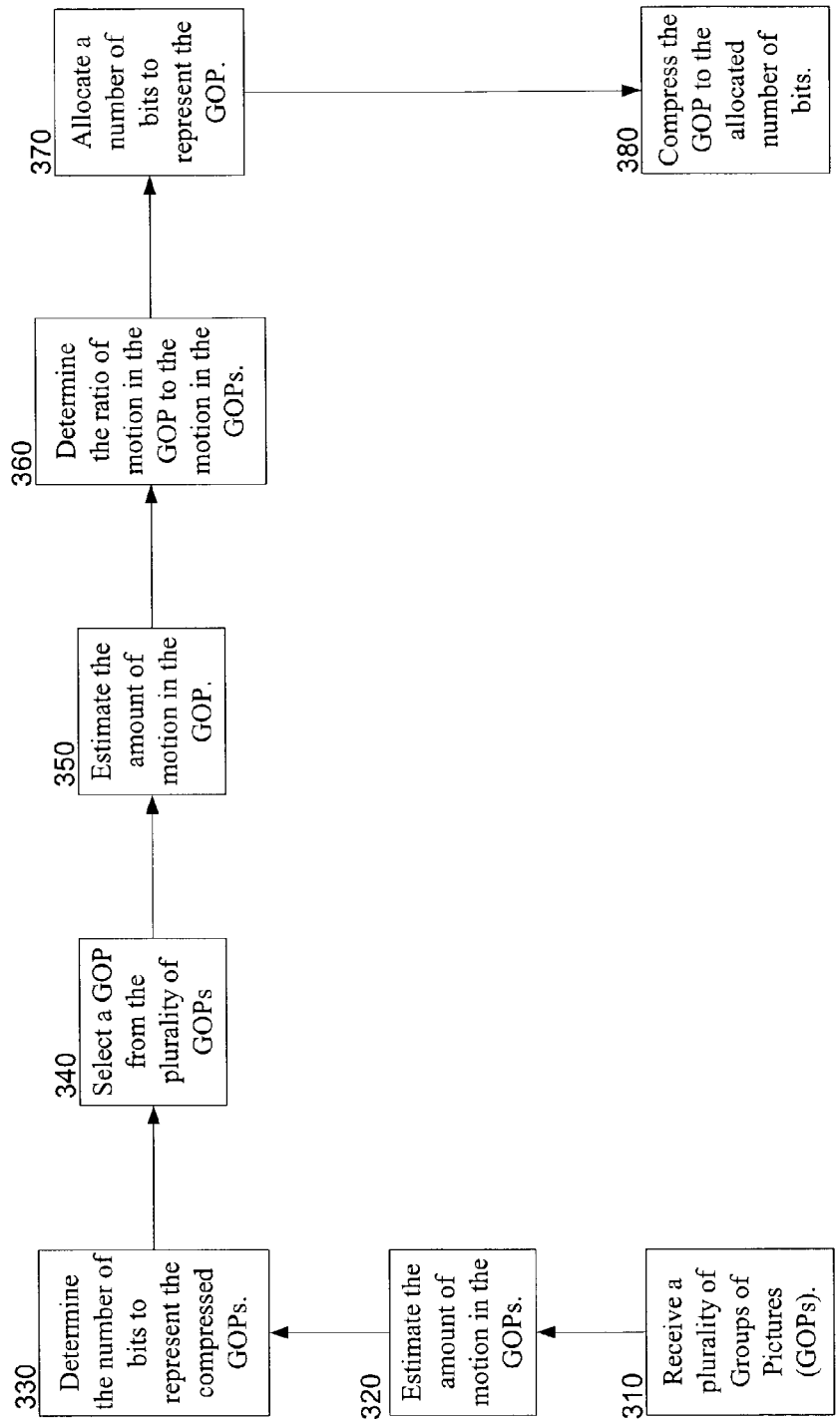
FIG. 3 is a flowchart illustrating a technique for controlling the bit rate of a compressed video data in accordance with an embodiment of the disclosed subject matter.

FIG. 3 is a flowchart illustrating a technique for controlling the bit rate of a compressed video data in accordance with an embodiment of the disclosed subject matter. In comparison to the specific embodiment illustrated by FIG. 2, FIG. 3 is a more general embodiment of the disclosed subject matter. Block 310 illustrates receiving a plurality of groups of pictures (GOPs). It is contemplated that the plurality of received groups of pictures (GOPs) may represent a video in its entirety or merely a number of GOPs of the video data. It is further contemplated that the plurality of GOPs may be received in a compressed or uncompressed format. In some embodiments, any compressed GOPs may be uncompressed before processing. It is contemplated that video data could take a form similar to, for example, a television or movie, or, alternatively, a slide presentation. It is contemplated that the video data may or may not include audio elements, and may be in black and white, grayscale, or color. It is also contemplated that the video data or stream may occur in real time, such as, for example, a television broadcast, or be substantially available for random access, such as, for example, a video stored upon a disk.

Block 320 illustrates that the amount of motion in the received plurality of GOPs may be estimated. In one embodiment the amount of motion in the plurality GOP may estimated by measuring the amount of motion in each GOP of the plurality of GOPs. In one embodiment, these individual motion estimates may be summed.

In one embodiment, the amount of motion in a GOP may be estimated by computing a motion vector utilizing the Sum-of-Absolute Differences (SAD) of components of the pictures in the group. For example, a frame of the GOP may be divided into macroblocks, which are defined above. The macroblock of the current frame may be compared to a corresponding macroblock of a previous frame, and the amount of difference between the two macroblocks computed. In one embodiment, the following SAD algorithm may be used:

$$SAD = \min_{(x,y) \in S} \sum_{j=0}^{15} \sum_{i=0}^{15} \left| C[i,j] - R[x_o + x + i, y_o + y + j] \right|,$$

where: $(x_o, y_o)$ is the upper left corner of the current macroblock; $C[x,y]$ is the current macroblock luminance samples; $R[x,y]$ is the reconstructed previous frame luminance sample; and S is the search range, possibly 16 in the case of a 16×16 pixel macroblock. Of course, it will be appreciated that other motion estimation techniques may be utilized, and that this is merely one specific illustrative example.

In one embodiment, the amount of motion in a GOP may be computed by averaging the individual SADs from each frame of the GOP. It is contemplated that other techniques for determining the amount of motion in a GOP may be used. As discussed above, the amount of motion in the plurality of GOPs may be derived from the amount of motion in each of the GOPs comprising the plurality of GOPs. In one embodiment, the individual motion estimates of the individual GOPs may be summed to determine the overall motion estimate for the plurality of the GOPs.

Block 330 illustrates that the number of bits desired to represent the compressed plurality of GOPs, the output of block 380, may be determined. It is contemplated that this value may be configurable, for example, a user may input that the compressed video data is to be represented by 640 megabytes (MBs). It is contemplated that, if the plurality of GOPs is less than the entire video, the number of bits desired to represent the plurality of GOPs may be determined from the number of bits desired to represent the entire video.

In another example, the user may configure the compressed video data to be represented by 25% less bits then the uncompressed video data (the input of block 310). It is contemplated that the number of bits used may be dynamically determined. For example, the number of bits may be determined by the temporal length of the video data and a minimum number of bits per second. In another example, the number of bits may be determined by a quality setting and based upon the complexity of the video data. However, these are merely a few non-limiting examples of techniques that may be used to estimate the number of bits used to represent the compressed video data.

Block 340 illustrates that a GOP may be selected from the received plurality of GOPs. It is contemplated that the individual GOPs of the plurality of GOPs may be selected sequentially or out-of-order. It is further contemplated that the individual GOPs may have a varying or equivalent number of frames.

Block 350 illustrates that the amount of motion in the selected GOP may be estimated. In one embodiment, the amount of motion in the selected GOP may be estimated by computing a motion vector utilizing the SAD technique described above. It is contemplated that one embodiment may simply use a motion estimation of the individual GOP computed as part of block 320.

Block 360 illustrates that, once the amount of motion in the selected GOP (block 350) and the plurality of GOPs (block 320) is estimated, a ratio of motion may be determined. A ratio of the amount of motion in the selected GOP to the amount of motion in the plurality of GOPs may be estimated. This motion ratio may capture the percentage of complexity in the video data found in the selected GOP. It is contemplated that other techniques may be used to capture the complexity of the selected GOP.

Block 370 illustrates that the number of bits used to represent the selected GOP may be allocated by assigning a portion of the total bits used for the plurality of GOPs (block 330) to the selected GOP. These bits may be assigned utilizing the ratio computed in block 360. In one embodiment, the number of bits assigned may be in direct proportion to the ratio of motion determined in block 360. For example, the following algorithm may be utilized in some embodiments of the disclosed subject matter:

$$R_i = T\left(\frac{motion_i}{motion_i + \ldots + motion_n}\right)$$

where, R is the number of bits allocated to the $i^{th}$ GOP; T is the number of bits used to represent the total video data, and $motion_i$ is the estimate of motion in the i-th GOP (blocks 350 or 320). It is contemplated that the number of bits may be assigned using methods other than direct proportion to the ratio of motion. For example, it is contemplated that the bits may be allocated using methods, such as, multiples of the ratio of motion, or a user defined weight. However, these are merely a few non-limiting examples.

Block 380 illustrates that the selected GOP may be compressed to the allocated number of bits (block 370). It is contemplated that the selected GOP may be compressed utilizing a variety of compression techniques, such as, a discrete-cosine transform (DCT), sideband encoding or wavelet encoding. In a specific embodiment of the disclosed subject matter, the GOP may be compressed using a technique substantially in compliance with the MPEG standard or a predecessor or derivative of the standard (hereafter, known as the "MPEG family of standards," "MPEG"). ISO/IEC JTC1/SC29/WG11/MPEG97/N1902: "Committee Draft of ISO/IEC 14496-2 (MPEG-4 Visual), November 1997. In another specific embodiment, the GOP may be compressed using a technique substantially in compliance with the International Telecommunication Union (ITU) H.263 or H.261 standards or a predecessor or derivative of the standards (hereafter, known as the "ITU family of standards"). ITU-T Recommendation H.261: "Video Codec for Audiovisual Services at px64 kbits/s," Geneve 1990. ITU-T Recommendation H.263: "Video Coding For Low Bitrate Communication," Geneve 1996. It yet other embodiment, the GOP may be compressed using a technique substantially in compliance with the Quicktime standard, or a derivative of the standard (hereafter, known as "Quicktime"). Apple Computer Inc., *Inside MacIntosh: Quicktime*, Addison Wesley, 1993. It is contemplated that a variety of other compression standards may be utilized and that these are merely a few non-limiting examples.

Figure 4:
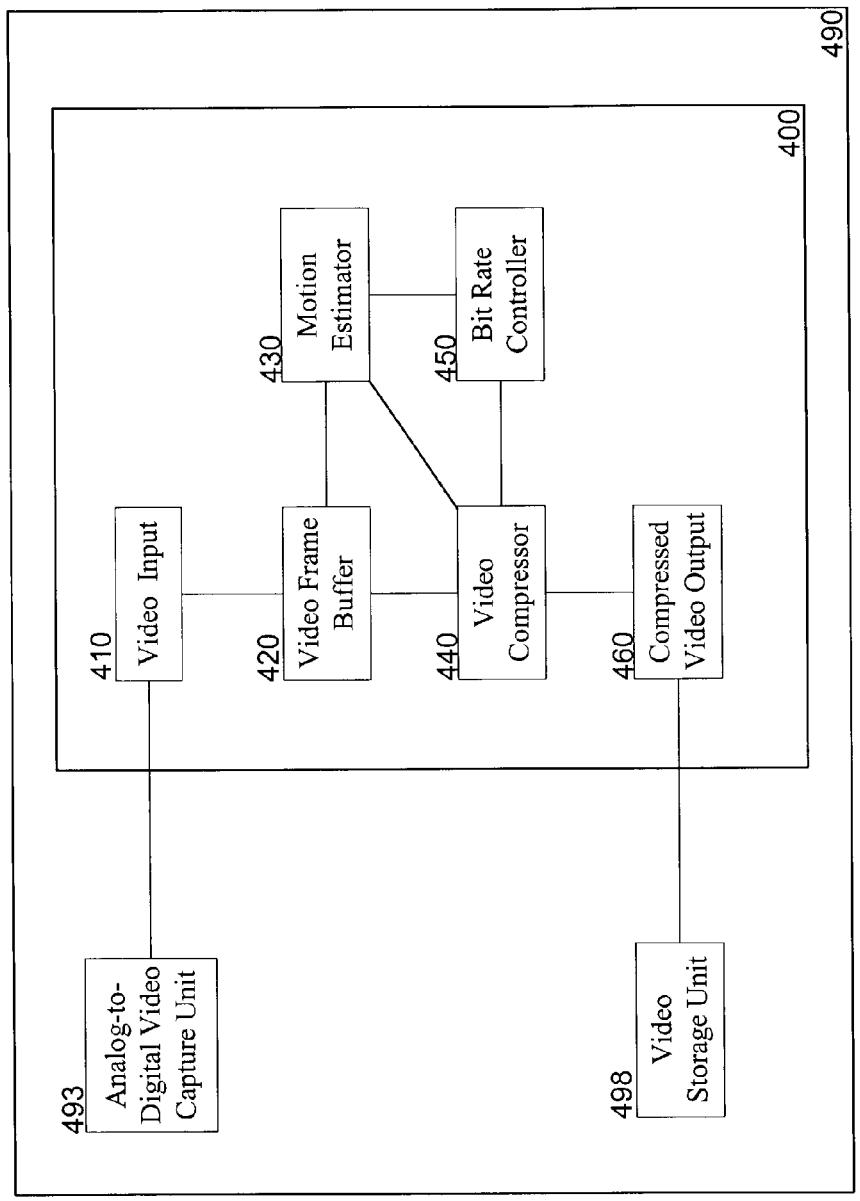
FIG. 4 is a block diagram illustrating an embodiment of an apparatus or system to control the bit rate of a compressed video data in accordance with an embodiment of the disclosed subject matter.

FIG. 4 is a block diagram illustrating an embodiment of an apparatus or system to control the bit rate of a compressed video data in accordance with an embodiment of the disclosed subject matter. Device 400 may contain a video input 410 to receive a video data. This video data may be stored in video frame buffer 420. It is contemplated that video frame buffer 420 may store a single GOP, as illustrated in FIG. 3, or a series of GOPs, as illustrated in block 310. It is contemplated that video frame buffer 420 may be a dedicated frame buffer or a general-purpose memory.

Motion estimator 430 may estimate the amount of motion in the GOP or GOPs stored in video frame buffer 420. This motion estimation may occur in much the same manner as detailed in the description of FIG. 3 above. This motion estimation may be made available to bit rate controller 450. Bit rate controller 450 may allocate a number of bits to represent a GOP stored in frame buffer 420. Bit rate controller 450 may allocate the number of bits in a manner much the same manner as detailed in the description of FIG. 3 above.

Video compressor 440 may compress the GOP to the allocated number of bits. It is contemplated that video compressor 440 may utilize the motion estimation from motion estimator 430 to facilitate the compression of the GOP. It is contemplated that a variety of compression techniques may be used, some detailed above.

FIG. 4 also illustrates a system of the disclosed subject matter. Device 400 may be combined with analog-to-digital video capture unit 493 and video storage unit 498. Analog-to-digital video capture unit 493 may capture raw video and convert it into a digital form usable by video input 410. In a specific example, where system 490 is a video camera, video capture unit 493 may be part of the lens system. It is contemplated that other embodiments of the system exist and that this is merely one non-limiting example. Video storage unit 498 may be a component to store the compressed video data. In a specific example, video storage unit 498 may be a removable flash memory component. It is contemplated that other embodiments of the storage unit exist and that this is merely one non-limiting example.

Some portions of the detailed description that follow are presented in terms of algorithms and symbolic representations of operations on data bits or binary digital signals within a computer memory. These algorithmic descriptions and representations are the techniques used by those skilled in the data processing arts to convey the substance of their work to others skilled in the art. An algorithm here, and generally, is considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise, as apparent from the following discussions, it will be appreciated that throughout the specification discussions utilizing terms such as "processing" or "computing" or "calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

The techniques described herein are not limited to any particular hardware or software configuration; they may find applicability in any local and/or distributed computing or processing environment. The techniques may be implemented in hardware, software or a combination of the two. The techniques may be implemented in programs executing on programmable machines such as mobile or stationary computers, personal digital assistants, and similar devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g. compact read only memory (CD-ROM), digital versatile disk (DVD), hard disk, magnetic disk or similar medium or device, that is readable by a general or special purpose programmable machine for configuring and operating the machine when the storage medium or device is read by the computer to perform the procedures described herein. The system may also be considered to be implemented as a machine-readable storage medium, configured with a program, where the storage medium so configured causes a machine to operate in a specific manner. Other embodiments are within the scope of the following claims.

While certain features of the disclosed subject matter have been illustrated and described herein, many modifications, substitutions, changes, and equivalents will now occur to those skilled in the art. It is, therefore, to be understood that the appended claims are intended to cover all such modifications and changes that fall within the true spirit of the disclosed subject matter.

What is claimed is:

1. A method comprising:
   receiving a first plurality of groups of pictures (GOPs);
   estimating a first amount of motion in the plurality of GOPs;
   selecting a GOP from the plurality of GOPs;
   estimating a second amount of motion in the selected GOP; and
   setting a first number of bits to represent the selected GOP based at least in part upon the first estimation of motion and the second estimation of motion; and
   wherein setting the first number of bits includes:
      assigning a second number of bits to represent the plurality of groups of pictures (GOPs), and
      allocating a first portion of the second number of bits to the selected GOP based at least in part upon the second amount of motion in the selected GOP; and
   wherein allocating the first portion of bits includes:
      determining a first ratio of motion between the estimated second amount of motion to the first estimated amount of motion and
      setting the first number of bits based, at least in part, upon the first ratio of motion.

2. The method of claim 1, wherein setting the first number of bits based, at least in part, upon the first ratio of motion involves at least one of the following techniques:
   allocating the first number of bits in proportion to the first ratio of motion;
   allocating the first number of bits in multiples of the first ratio of motion; and
   allocating the first number of bits based in part upon a user defined weight.

3. The method of claim 1, wherein estimating the second amount of motion includes computing the average sum-of-absolute-differences between frames in the selected GOP.

4. The method of claim 3, further comprising
   compressing the selected GOP to the first number of bits; and
   wherein, the sum-of-absolute-differences is utilized to compress the selected GOP.

5. The method of claim 4, wherein compressing the selected GOP includes utilizing a compression scheme substantially in compliance with at least one of the following compression schemes:
   the H.263 or H.261 video compression standards;
   the Moving Pictures Experts Group (MPEG) family of video compression standards;
   the QuickTime family of standards; and
   a video compression standard utilizing a transform including at least one of the following:
      a discrete-cosine transform (DCT), a sub-band coding transform, and wavelet transform.

6. The method of claim 1, wherein estimating a first amount of motion in the plurality of GOPs includes estimating a second amount of motion in the selected GOP.

7. An apparatus comprising:
   a video frame buffer to
      store a first plurality of group of pictures (GOPs); and
      store a first GOP selected from the first plurality of group of pictures (GOPs);
   a motion estimator to
      estimate a first amount of motion in the first plurality of GOPs; and
      estimate a second amount of motion in the first selected GOP;
   a bit rate controller to
      allocate a first number of bits to represent the selected GOP,
      assign a second number of bits to represent the plurality of GOPs,
      determine a first ratio of motion between the second amount of motion and the first amount of motion, and
      allocate a first portion of the second number of bits to the selected GOP based, at least in part, upon the first ratio; and
   a video compressor to
      compress the selected GOP to the first number of bits.

8. The apparatus of claim 7, wherein the bit rate controller is capable of, during operation,
  storing a value representing a second number of bits to represent the first plurality of GOPs; and
  allocating a first portion of the second number of bits to the selected GOP.

9. The apparatus of claim 8, wherein the bit rate controller is capable of, during operation, allocating a first portion of bits utilizing at least one of the following techniques:
  allocating in proportion to the first ratio of motion;
  allocating in multiples of the first ratio of motion; and
  allocating based in part upon a preconfigured weight value.

10. The apparatus of claim 7, wherein the motion estimator is capable of, during operation, estimating a second amount of motion in the first selected GOP, at least in part, by utilizing the average sum-of-absolute differences between frames in the first selected GOP.

11. The apparatus of claim 10, wherein the video compressor is capable of, during operation, compressing the first selected GOP by utilizing the sum-of-absolute differences between frames in the first selected GOP.

12. The apparatus of claim 11, wherein a video compressor, during operation, compresses the first selected GOP utilizing a compression scheme substantially in compliance with at least one of the following compression schemes:
  the H.263 or H.261 video compression standards;
  the Moving Pictures Experts Group (MPEG) family of video compression standards;
  the QuickTime family of standards; and
  a video compression standard utilizing a transform including at least one of the following:
    a discrete-cosine transform (DCT), a sub-band coding transform, and wavelet transform.

13. The apparatus of claim 7, wherein the motion estimator utilizes, during operation, the estimate of the second amount of motion in the first selected GOP in estimating the first amount of motion in the first plurality of GOPs.

14. A system comprising:
  an analog-to-digital capture unit to convert analog signals to a digital first plurality of group of pictures (GOPs);
  a video frame buffer to
    store the first plurality of group of pictures (GOPs); and
    store a first GOP selected from the first plurality of group of pictures (GOPs);
  a motion estimator to
    estimate a first amount of motion in the first plurality of GOPs; and
    estimate a second amount of motion in the first selected GOP;
  a bit rate controller to
    allocate a first number of bits to represent the selected GOP,
    assign a second number of bits to represent the plurality of GOPs,
    determine a first ratio of motion between the second amount of motion and the first amount of motion, and
    allocate a first portion of the second number of bits to the selected GOP based, at least in part, upon the first ratio; and
  a video compressor to
    compress the first GOP to the first number of bits; and
  a video storage unit to store the compressed first GOP.

15. The system of claim 14, wherein the bit rate controller is capable of, during operation,
  storing a value representing a second number of bits to represent the first plurality of GOPs; and
  allocating a first portion of the second number of bits to the selected GOP.

16. The system of claim 15, wherein the bit rate controller is capable of, during operation, allocating a first portion of bits utilizing at least one of the following techniques:
  allocating in proportion to the first ratio of motion;
  allocating in multiples of the first ratio of motion; and
  allocating based in part upon a preconfigured weight value.

17. The system of claim 14, wherein the motion estimator is capable of, during operation, estimating a second amount of motion in the first selected GOP, at least in part, by utilizing the average sum-of-absolute differences between frames in the first selected GOP.

18. The system of claim 17, wherein the video compressor is capable of, during operation, compressing the first selected GOP by utilizing the sum-of-absolute differences between frames in the first selected GOP.

19. The system of claim 18, wherein a video compressor, during operation, compresses the first selected GOP utilizing a compression scheme substantially in compliance with at least one of the following compression schemes:
  the H.263 or H.261 video compression standards;
  the Moving Pictures Experts Group (MPEG) family of video compression standards;
  the QuickTime family of standards; and
  a video compression standard utilizing a transform including at least one of the following:
    a discrete-cosine transform (DCT), a sub-band coding transform, and wavelet transform.

20. The system of claim 14, wherein the motion estimator utilizes, during operation, the estimate of the second amount of motion in the first selected GOP in estimating the first amount of motion in the first plurality of GOPs.

21. An article comprising:
  a storage medium having a plurality of machine accessible instructions, wherein when the instructions are executed by a machine, the instructions provide for
    receiving a first plurality of groups of pictures (GOPs);
    estimating a first amount of motion in the plurality of GOPs;
    selecting a GOP from the plurality of GOPs;
    estimating a second amount of motion in the selected GOP; and
    setting a first number of bits to represent the selected GOP based at least in part upon the first estimation of motion and the second estimation of motion; and
  wherein the instructions that provide for setting a first number of bits include instructions that provide for:
    assigning a second number of bits to represent the plurality of groups of pictures (GOPs); and
    allocating a first portion of the second number of bits to the selected GOP based at least in part upon the second amount of motion in the selected GOP; and
  wherein the instructions that provide for allocating a first portion include instructions that provide for:
    determining a first ratio of motion between the estimated second amount of motion to the first estimated amount of motion and
    setting the first number of bits based, at least in part, upon the first ratio of motion.

* * * * *